(12) United States Patent
Cho (10) Patent No.: US 10,984,954 B2
(45) Date of Patent: Apr. 20, 2021

(54) CAPACITOR ARRAY

(71) Applicant: SAMSUNG ELECTRO-MECHANICS CO., LTD., Suwon-si (KR)

(72) Inventor: Beom Joon Cho, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 73 days.

(21) Appl. No.: 16/174,552

(22) Filed: Oct. 30, 2018

(65) Prior Publication Data

US 2020/0075262 A1 Mar. 5, 2020

(30) Foreign Application Priority Data

Aug. 29, 2018 (KR) .................. 10-2018-0101968

(51) Int. Cl.
*H01G 4/232* (2006.01)
*H01G 4/38* (2006.01)
(Continued)

(52) U.S. Cl.
CPC .............. *H01G 4/232* (2013.01); *H01G 4/224* (2013.01); *H01G 4/30* (2013.01); *H01G 4/38* (2013.01);
(Continued)

(58) Field of Classification Search
CPC ............ H01G 4/38; H01G 4/30; H01G 4/248; H01G 4/224; H01G 2/06; H01G 4/232
See application file for complete search history.

(56) References Cited

U.S. PATENT DOCUMENTS 6,515,844 B1   2/2003  Moriwaki et al.
8,331,078 B2 * 12/2012 McConnell ............ H01G 4/232
                                                361/303
(Continued)

FOREIGN PATENT DOCUMENTS

CN        1532860 A    9/2004
CN      110838410 A    2/2020
(Continued)

OTHER PUBLICATIONS

Notice of Office Action dated Nov. 21, 2019 in Korean Patent Application No. 10-2018-0101968 (With English Abstract).
(Continued)

*Primary Examiner* — David M Sinclair
(74) *Attorney, Agent, or Firm* — Morgan, Lewis & Bockius LLP (57) ABSTRACT

An electronic component includes a capacitor array including a plurality of multilayer capacitors which are sequentially arranged in a first direction; and a pair of metal frames disposed on opposing side surfaces of the capacitor array, respectively, and connected to first and second external electrodes of the plurality of multilayer capacitors, respectively, wherein the metal frames include: support portions bonded to head portions of the external electrodes; and a mounting portion extending in a second direction perpendicular to the first direction from lower ends of the support portions, and one or more cutting portions are formed in portions of lower sides of the support portions and the mounting portion.

15 Claims, 9 Drawing Sheets

(51) Int. Cl.
*H01G 4/30* (2006.01)
*H01G 4/224* (2006.01)
*H01G 4/12* (2006.01)

(52) U.S. Cl.
CPC ......... *H01G 4/1227* (2013.01); *H01G 4/1245* (2013.01)

(56) References Cited

U.S. PATENT DOCUMENTS

| | | | | |
|---|---|---|---|---|
| 8,873,219 | B2* | 10/2014 | Perea | H01C 1/14 361/303 |
| 10,056,320 | B2* | 8/2018 | Murrell | H01G 4/232 |
| 2001/0007522 | A1* | 7/2001 | Nakagawa | H01G 4/38 361/301.4 |
| 2003/0011959 | A1* | 1/2003 | Moriwaki | H01G 4/232 361/308.1 |
| 2004/0183147 | A1 | 9/2004 | Togahi et al. | |
| 2009/0147440 | A1* | 6/2009 | Cygan | H01G 4/232 361/306.3 |
| 2010/0243307 | A1* | 9/2010 | McConnell | H01G 2/065 174/260 |
| 2016/0219739 | A1* | 7/2016 | Park | H01G 4/30 |
| 2020/0006002 | A1* | 1/2020 | Itamochi | H01G 4/1227 |
| 2020/0058448 | A1 | 2/2020 | Cho | |

FOREIGN PATENT DOCUMENTS

| | | | | |
|---|---|---|---|---|
| JP | 07-249541 A | | 9/1995 | |
| JP | 08017679 A | * | 1/1996 | |
| JP | 2000228327 A | * | 8/2000 | |
| JP | 2003017367 A | * | 1/2003 | |
| JP | 2004-273935 A | | 9/2004 | |
| JP | 2007329411 A | * | 12/2007 | |
| JP | 2008227101 A | * | 9/2008 | H01G 4/228 |
| JP | 2010-245381 A | | 10/2010 | |
| JP | 2010245381 A | * | 10/2010 | H01G 4/228 |
| JP | 2017199857 A | * | 11/2017 | |
| JP | 2000-049046 A | | 2/2018 | |
| KR | 10-1702398 B1 | | 2/2017 | |
| WO | WO-2011005378 A1 | * | 1/2011 | H01G 4/228 |

OTHER PUBLICATIONS

The First Office Action issued in Chinese Patent Application No. 201811579262.2 dated Feb. 9, 2021 (English translation).

* cited by examiner

CAPACITOR ARRAY

CROSS-REFERENCE TO RELATED APPLICATION(S)

This application claims the benefit of priority to Korean Patent Application No. 10-2018-0101968 filed on Aug. 29, 2018, in the Korean Intellectual Property Office, the disclosure of which is incorporated herein by reference in its entirety.

TECHNICAL FIELD

The present disclosure relates to an electronic component.

BACKGROUND

Multilayer capacitors are commonly used in a variety of electronic devices due to being able to be implemented with a small size and high capacity.

In recent years, due to the rapid rise in popularity of environmentally-friendly automobiles and electric vehicles, power driving systems in automobiles have increased, and accordingly, demand for the multilayer capacitors required for automobiles has also increased.

Since a high level of thermal reliability, electrical reliability, and mechanical reliability are required in use as an automotive part, the level of performance required for the multilayer capacitor is also being advanced.

In particular, there is an increasing demand for a modular electronic device having high resistance to vibrations and deformation, while allowing high capacity to be implemented by stacking a plurality of multilayer capacitors in a limited space.

SUMMARY

An aspect of the present disclosure may provide an electronic component capable of implementing a high capacity and improving thermal reliability, mechanical reliability, and tolerance to warpage deformation.

According to an aspect of the present disclosure, an electronic component may include a capacitor array including a plurality of multilayer capacitors which are sequentially arranged in a first direction; and a pair of metal frames disposed on opposing side surfaces of the capacitor array, respectively, and connected to first and second external electrodes of the plurality of multilayer capacitors, respectively, wherein the metal frames include: support portions bonded to head portions of the external electrodes; and a mounting portion extending in a second direction perpendicular to the first direction from lower ends of the support portions, and one or more cutting portions are formed in portions of lower sides of the support portions and the mounting portion.

One cutting portion may be formed on each boundary line of the multilayer capacitors adjacent to each other in the first direction.

The cutting portion may connect the portion of the lower side of the support portion and the mounting portion to each other to have an L shape.

When a length of the cutting portion in a thickness direction is d1, a length of the support portion in the thickness direction is t, a length of the cutting portion in the first direction is d2, and a length of the multilayer capacitor in the first direction is b, $0.01 \leq d1/t \leq 0.5$ and $0.01 \leq d2/b \leq 0.5$ may be satisfied.

The electronic component may further include a capsule portion encapsulating the capacitor array, wherein the mounting portion may be exposed externally of the capsule portion.

A conductive adhesive portion may be provided between the head portion of the external electrode and the support portion.

The multilayer capacitor may include a body, and the first and second external electrodes formed on opposite end surfaces of the body in a second direction, and the body may include a dielectric layer, and first and second internal electrodes which are alternately disposed while having the dielectric layer interposed therebetween.

The first and second external electrodes may include first and second head portions formed on the opposite end surfaces of the body in the second direction; and first and second band portions extending from the first and second head portions to portions of upper and lower surfaces of the body and portions of opposing side surfaces of the body.

The capacitor array may be stacked in at least two layers.

The support portions may extend to head portions of the plurality of multilayer capacitors of the capacitor array positioned on an upper side.

The electronic component may further include a capsule portion encapsulating the plurality of capacitor arrays, wherein the mounting portion may be exposed externally of the capsule portion.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings. In the accompanying drawings, shapes, sizes, and the like, of components may be exaggerated or stylized for clarity.

The present disclosure may, however, be exemplified in many different forms and should not be construed as being limited to the specific embodiments set forth herein. Rather these embodiments are provided so that this disclosure will be thorough and complete, and will fully convey the scope of the disclosure to those skilled in the art.

The term "an exemplary embodiment" used herein does not refer to the same exemplary embodiment, and is provided to emphasize a particular feature or characteristic different from that of another exemplary embodiment. However, exemplary embodiments provided herein are considered to be able to be implemented by being combined in whole or in part one with another. For example, one element described in a particular exemplary embodiment, even if it is not described in another exemplary embodiment, may be understood as a description related to another exemplary embodiment, unless an opposite or contradictory description is provided therein.

The meaning of a "connection" of a component to another component in the description includes an indirect connection through a third component as well as a direct connection between two components. In addition, "electrically connected" means the concept including a physical connection and a physical disconnection. It can be understood that when an element is referred to with "first" and "second", the element is not limited thereby. They may be used only for a purpose of distinguishing the element from the other elements, and may not limit the sequence or importance of the elements. In some cases, a first element may be referred to as a second element without departing from the scope of the claims set forth herein. Similarly, a second element may also be referred to as a first element.

Herein, an upper portion, a lower portion, an upper side, a lower side, an upper surface, a lower surface, and the like, are decided in the accompanying drawings. In addition, a vertical direction refers to the abovementioned upward and downward directions, and a horizontal direction refers to a direction perpendicular to the abovementioned upward and downward directions. In this case, a vertical cross section refers to a case taken along a plane in the vertical direction, and an example thereof may be a cross-sectional view illustrated in the drawings. In addition, a horizontal cross section refers to a case taken along a plane in the horizontal direction, and an example thereof may be a plan view illustrated in the drawings.

Terms used herein are used only in order to describe an exemplary embodiment rather than limiting the present disclosure. In this case, singular forms include plural forms unless interpreted otherwise in context.

Directions will be defined in order to clearly describe exemplary embodiments in the present disclosure. X, Y and Z in the drawings refer to a length direction, a width direction, and a thickness direction of a multilayer capacitor, respectively.

In addition, X, Y, and Z refer to a width direction, a length direction, and a thickness direction of a capacitor array, respectively.

Here, the Y direction refers to a stacked direction in which dielectric layers are stacked in the present exemplary embodiment.

Figure 1:
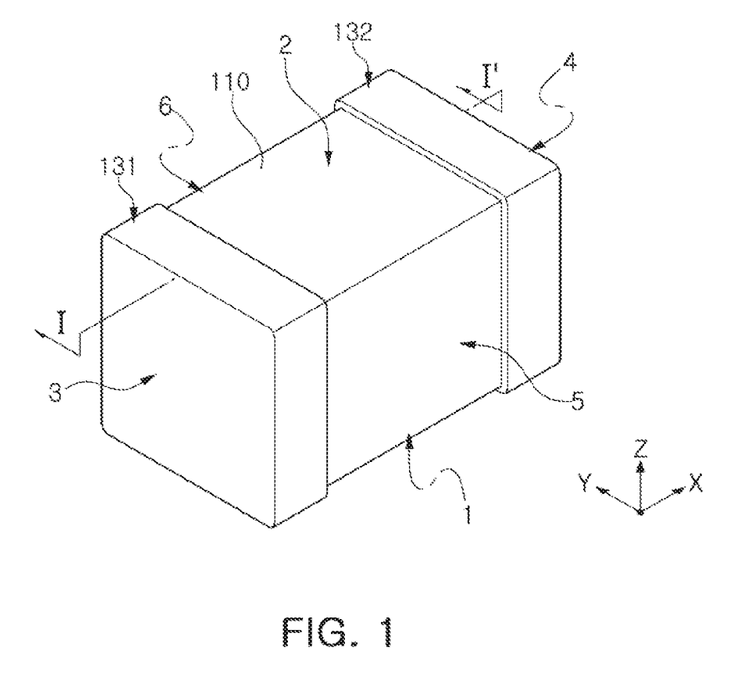
FIG. 1 is a perspective view schematically illustrating a multilayer capacitor applied to an exemplary embodiment in the present disclosure.
Figure 2A:
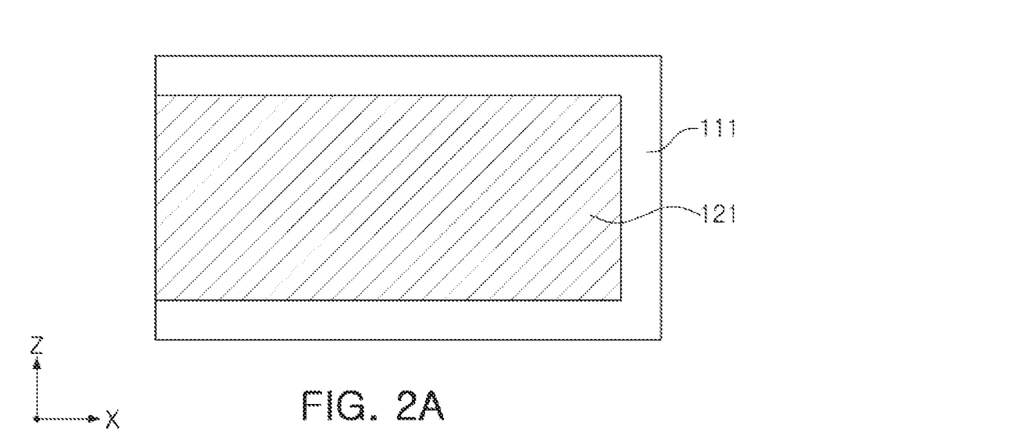
FIGS. 2A and 2B are plan views illustrating first and second internal electrodes applied to the multilayer capacitor of FIG. 1.
Figure 2B:
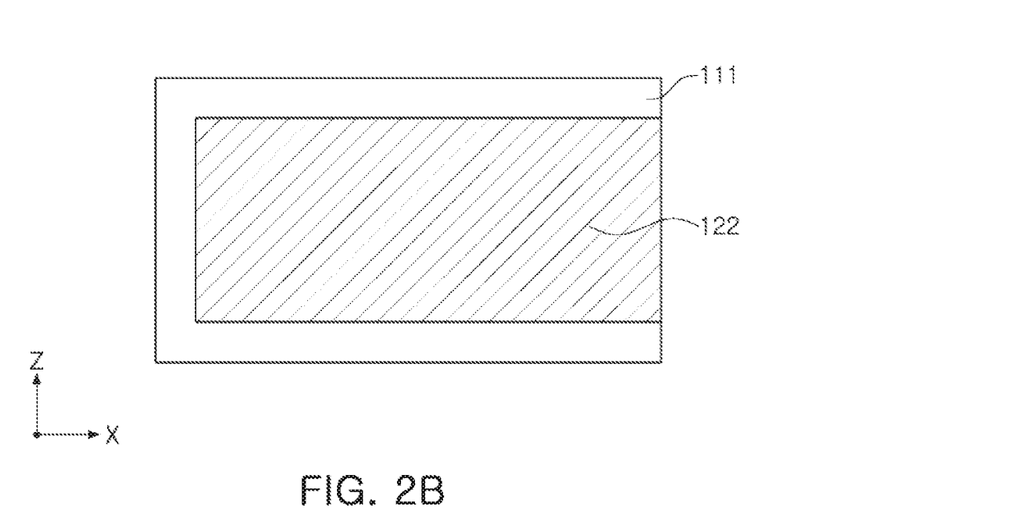
Figure 3:
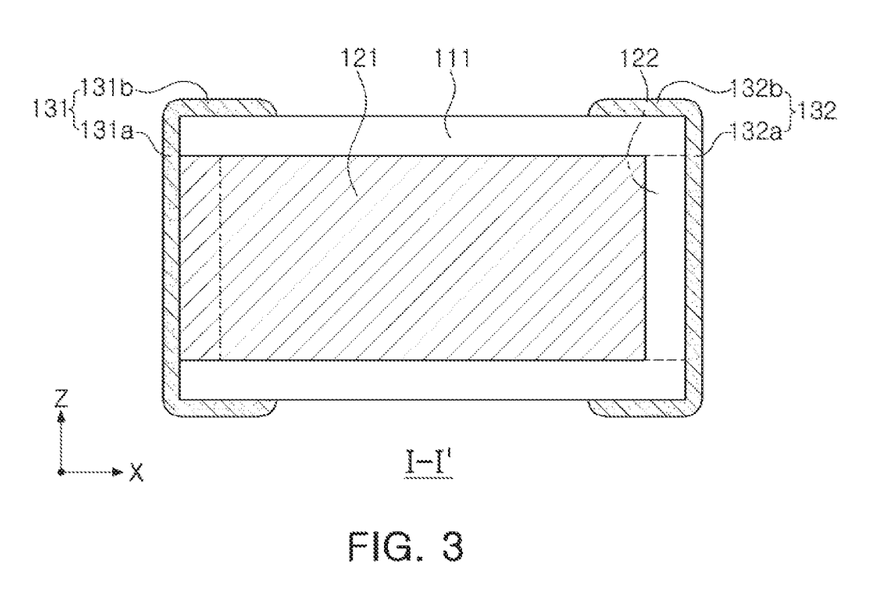
FIG. 3 is a cross-sectional view taken along a line I-I' of FIG. 1.

FIG. 1 is a perspective view schematically illustrating a multilayer capacitor applied to an exemplary embodiment in the present disclosure, FIGS. 2A and 2B are plan views illustrating first and second internal electrodes applied to the multilayer capacitor of FIG. 1, and FIG. 3 is a cross-sectional view taken along a line I-I' of FIG. 1.

First, a structure of a multilayer capacitor applied to an electronic component according to the present exemplary embodiment will be described with reference to FIGS. 1 through 3.

Referring to FIGS. 1 through 3, a multilayer capacitor 100 according to the present exemplary embodiment may include a body 110, and first and second external electrodes 131 and 132 formed on opposite end surfaces 3 and 4 of the body 110, respectively, in an X direction of the body 110.

The body 110 may be formed by stacking a plurality of dielectric layers 111 in a Y direction of the body 110 and then sintering the plurality of dielectric layers 111. The dielectric layers 111 adjacent to each other of the body 110 of the capacitor may be integrated with each other so that boundaries therebetween are not readily apparent without using a scanning electron microscope (SEM).

In addition, the body 110 may include the plurality of dielectric layers 111, and first and second internal electrodes 121 and 122 alternately disposed in a Y direction of the body 110 while having the dielectric layers 111 interposed therebetween and having different polarities.

In addition, the body 110 may include an active region, which is a portion contributing to formation of capacitance of the capacitor, and cover regions provided on left and right portions of the active region in the Y direction of the body 110 and upper and lower portions of the active region in a Z direction of the body 110 as margin portions.

A shape of the body 110 is not particularly limited, but may be a hexahedron shape. The body 110 may have first and second surfaces 1 and 2 opposing each other in the Z direction of the body 110, third and fourth surfaces 3 and 4 connected to the first and second surfaces 1 and 2 and opposing each other in the X direction of the body 110, and fifth and sixth surfaces 5 and 6 connected to the first and second surfaces 1 and 2, connected to the third and fourth surfaces 3 and 4, and opposing each other in the Y direction of the body 110.

The dielectric layer 111 may include a ceramic powder, for example, a BaTiO$_3$ based ceramic powder or the like.

An example of the barium titanate (BaTiO$_3$) based ceramic powder may include (Ba$_{1-x}$Ca$_x$)TiO$_3$, Ba(Ti$_{1-y}$Ca$_y$)O$_3$, (Ba$_{1-x}$Ca$_x$)(Ti$_{1-31\,y}$Zr$_y$)O$_3$, Ba(Ti$_{1-y}$Zr$_y$)O$_3$, and the like, in which Ca, Zr, or the like, is partially dissolved in BaTiO$_3$, but is not limited thereto.

In addition, the dielectric layer 111 may further include a ceramic additive, an organic solvent, a plasticizer, a binder, a dispersant, and the like, in addition to the ceramic powder.

The ceramic additive may include, for example, a transition metal oxide or carbide, a rare earth element, magnesium (Mg), aluminum (Al), or the like.

The first and second internal electrodes 121 and 122, which are electrodes to which different polarities are applied, may be formed on the dielectric layer 111 to be stacked in the Y direction of the body 110, and may be alternately disposed in the body 110 so as to opposite to each other along the Y direction of the body 110 while having one dielectric layer 111 interposed therebetween.

The first and second internal electrodes 121 and 122 may be electrically insulated from each other by the dielectric layer 111 disposed therebetween.

Meanwhile, the present disclosure illustrates and describes a structure in which the internal electrodes are staked in the Y direction of the body 110, but the present disclosure is not limited thereto and may also be applied to a structure in which the internal electrodes are stacked in the Z direction of the body, if necessary.

One end portion of each of the first and second internal electrodes 121 and 122 may be exposed through the third and fourth surfaces 3 and 4 of the body 110, respectively.

The end portions of the first and second internal electrodes 121 and 122 alternately exposed through the third and fourth surfaces 3 and 4 of the body 110 may be electrically connected to the first and second external electrodes 131 and 132 disposed on the opposite end surfaces of the body 110 in the X direction of the body 110, respectively, to be described below.

According to the configuration as described above, when a predetermined voltage is applied to the first and second external electrodes 131 and 132, electric charges may be accumulated between the first and second internal electrodes 121 and 122.

A capacitance of the multilayer capacitor 100 may be proportional to an overlapping area of the first and second internal electrodes 121 and 122 overlapping with each other along the Y direction of the body 110 in the active region.

In addition, a material forming the first and second internal electrodes 121 and 122 is not particularly limited, but may be a conductive paste formed of one or more of, for example, a noble metal material such as platinum (Pt), palladium (Pd), a palladium-silver (Pd-Ag) alloy, or the like, nickel (Ni), and copper (Cu).

A method of printing the conductive paste may be a screen printing method, a gravure printing method, or the like, but is not limited thereto.

Voltages having different polarities may be provided to the first and second external electrodes 131 and 132, and the first and second external electrodes 131 and 132 may be disposed on the opposite end surfaces of the body 110 in the X direction of the body 110, and may be electrically connected to the exposed end portions of the first and second internal electrodes 121 and 122, respectively.

The first external electrode 131 may include a first head portion 131a and a first band portion 131b.

The first head portion 131a may be disposed on the third surface 3 of the body 110, and may be in contact with the end portion of the first internal electrode 121 exposed to the outside through the third surface 3 of the body 110 to serve to electrically connect the first internal electrode 121 and the first external electrode 131 to each other.

The first band portion 131b may be a portion extending from the first head portion 131a to portions of the first, second, fifth, and sixth surfaces 1, 2, 5, and 6 of the body 110 to improve fixing strength.

The second external electrode 132 may include a second head portion 132a and a second band portion 132b.

The second head portion 132a may be disposed on the fourth surface 4 of the body 110, and may be in contact with the end portion of the second internal electrode 122 exposed to the outside through the fourth surface 4 of the body 110 to serve to electrically connect the second internal electrode 122 and the second external electrode 132 to each other.

The second band portion 132b may be a portion extending from the second head portion 132a to portions of the first, second, fifth, and sixth surfaces 1, 2, 5, and 6 of the body 110 to improve fixing strength.

Meanwhile, the first and second external electrodes 131 and 132 may further include a plating layer.

The plating layer may include first and second nickel (Ni) plating layers, and first and second tin (Sn) plating layers covering the first and second Ni plating layers, respectively.

Figure 4:
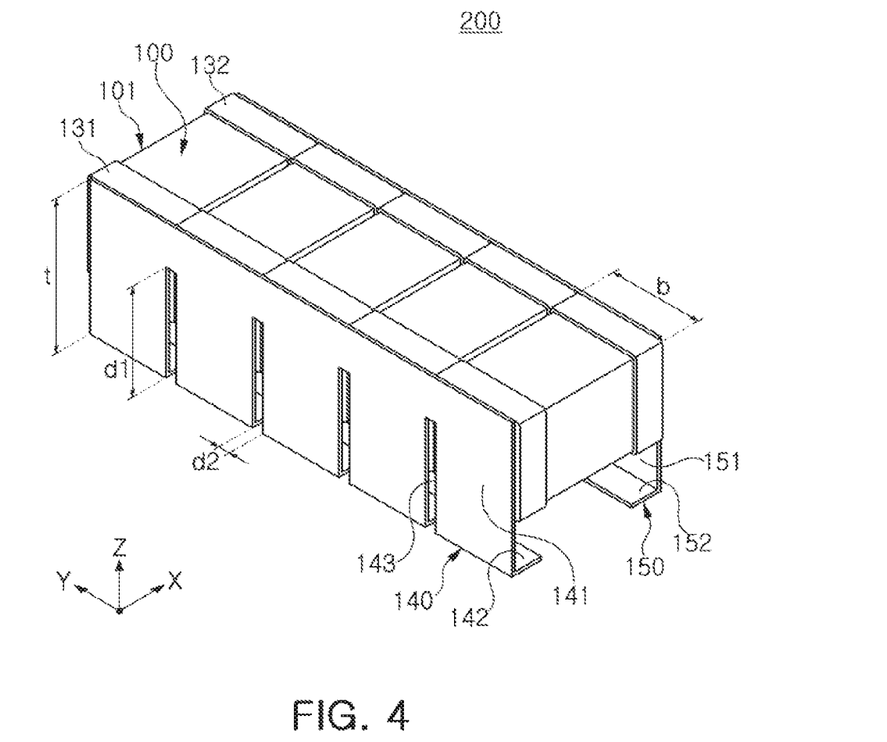
FIG. 4 is a perspective view illustrating a schematic structure of an electronic component according to an exemplary embodiment in the present disclosure.
Figure 5:
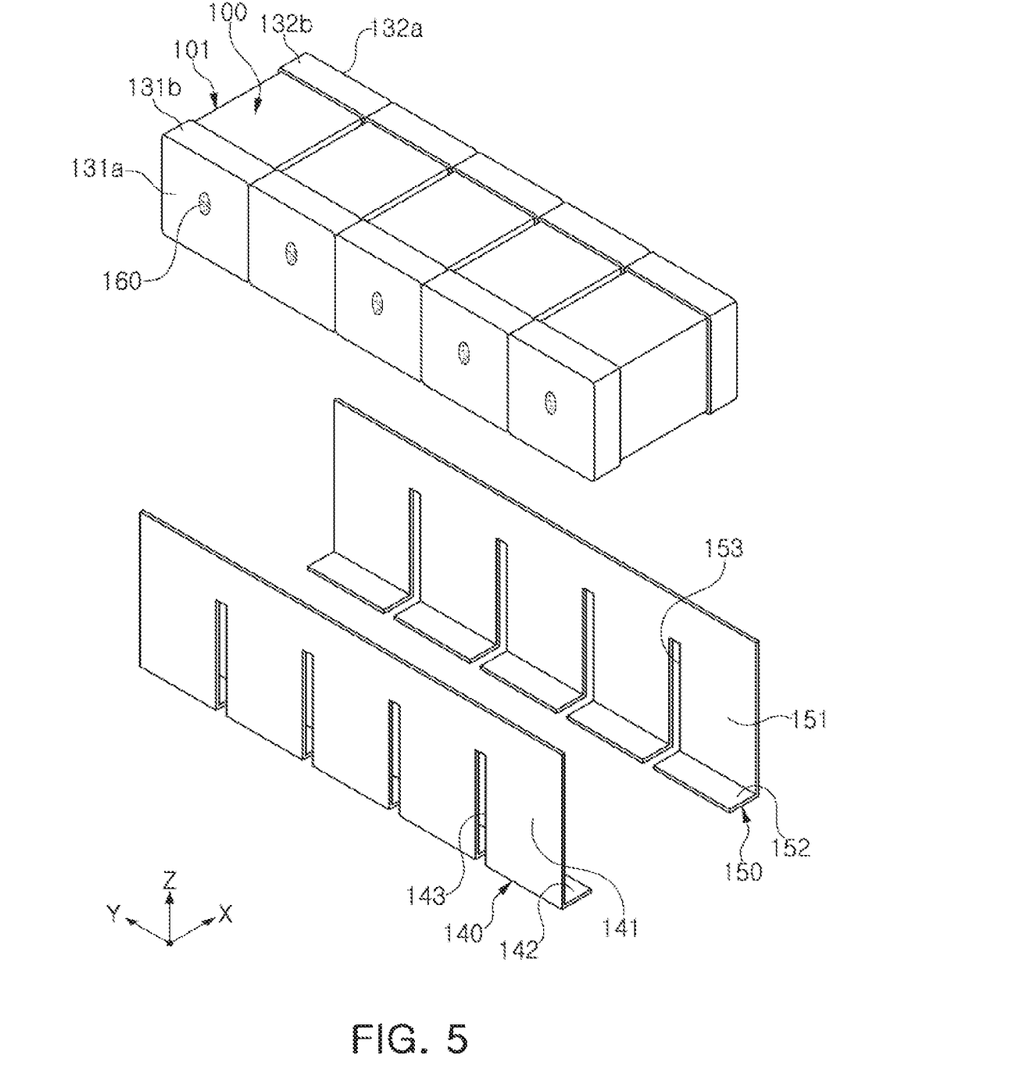
FIG. 5 is an exploded perspective view of the electronic component of FIG. 4.

FIG. 4 is a perspective view illustrating a schematic structure of an electronic component according to an exemplary embodiment in the present disclosure and FIG. 5 is an exploded perspective view of the electronic component of FIG. 4.

Referring to FIGS. 4 and 5, an electronic component 200 according to the present exemplary embodiment may include a capacitor array 101 including a plurality of multilayer capacitors 100 which are sequentially arranged in the Y direction, which is the first direction, a first metal frame 140 disposed on one side surface of the capacitor array 101 in an X direction thereof and connected to the first external electrode 131 of each of the plurality of multilayer capacitors 100, and a second metal frame 150 disposed on the other side surface of the capacitor array 101 in the X direction thereof and connected to the second external electrode 132 of each of the plurality of multilayer capacitors 100.

The first metal frame 140 may be bonded to the respective first external electrodes 131 of the plurality of multilayer capacitors 100 to serve as a common electrode connecting the first external electrodes 131 adjacent to each other to each other.

Such a first metal frame 140 may include a first support portion 141 and a first mounting portion 142.

The first support portion 141 may be a portion which is perpendicular to a mounting surface, is elongated in the Y direction, and is bonded to the respective first head portions 131a of the plurality of first external electrodes 131, and may electrically and physically connect the first head portions 131a of the plurality of first external electrodes 131 to each other.

In addition, a length of the first support portion 141 in the Y direction may be set to be substantially similar to a total length of the capacitor array 101 in the Y direction so that the first support portion 141 may be connected to the first external electrodes 131 of all the multilayer capacitors 100.

A conductive adhesive portion 160 may be provided between each of the first external electrodes 131 and the first support portion 141.

According to the present exemplary embodiment, the conductive adhesive portion 160 may be provided on the respective first head portions 131a of the first external electrodes 131.

Such a conductive adhesive portion 160 may be formed of a high temperature solder, a conductive adhesive material, or the like, but is not limited thereto.

The first mounting portion 142 may be a portion extending the second direction, i.e., the X direction, perpendicular to the second direction perpendicular to the first direction, from a lower end of the first support portion 141 and formed to be horizontal with respect to the mounting surface, and may serve as a connection terminal at the time of mounting the substrate.

The first mounting portion 142 may be disposed to be spaced apart from a lower surface of the multilayer capacitor 100 by a predetermined distance in the Z direction.

In addition, the first metal frame 140 may include a first cutting portion 143.

One or more first cutting portions 143 may be formed in a portion of a lower side of the first support portion 141 and the first mounting portion 142.

Because the first cutting portions 143 are formed only in the lower portion of the first support portion 141, an upper portion of the first support portion 141 may be maintained in a long connected state.

In addition, one first cutting portion 143 may be formed on the respective boundary lines of the multilayer capacitors 100 adjacent to each other in the Y direction.

According to the present exemplary embodiment, since the number of the multilayer capacitors 100 constituting the capacitor array 101 is five in total, four first cutting portions 143 may be formed.

By such first cutting portions 143, the first metal frame 140 may have a structure such that the support portion is individually bonded to each of the multilayer capacitors 100, and as a result, at the time of warpage deformation, the first support portion 141 may be divided into portions (five shown in FIG. 4, corresponding to five multilayer capacitors) that may be individually deformed.

In addition, the first cutting portion 143 may connect a portion of the lower side of the first support portion 141 and the first mounting portion 142 to each other.

That is, the first cutting portion 143 according to the present exemplary embodiment may be formed in an L-shape.

The second metal frame 150 may be bonded to the respective second external electrodes 132 of the plurality of multilayer capacitors 100 to serve as a common electrode connecting the second external electrodes 132 adjacent to each other to each other.

Such a second metal frame 150 may include a second support portion 151 and a second mounting portion 152.

The second support portion 151 may be a portion which is perpendicular to the mounting surface, is elongated in the Y direction, and is bonded to the respective second head portions 132a of the plurality of second external electrodes 132, and may electrically and physically connect the second head portions 132a of the plurality of second external electrodes 132 to each other.

In addition, a length of the second support portion 151 in the Y direction may be set to be substantially similar to a total length of the capacitor array 101 in the Y direction so that the second support portion 151 may be connected to the second external electrodes 132 of all the multilayer capacitors 100.

A conductive adhesive portion 160 may be each provided between the second external electrodes 132 and the second support portion 151.

According to the present exemplary embodiment, the conductive adhesive portion 160 may be provided in the respective second head portions 132a of the second external electrodes 132.

Such a conductive adhesive portion 160 may be formed of a high temperature solder, a conductive adhesive material, or the like, but is not limited thereto.

The second mounting portion 152 may be a portion extending in the second X direction, i.e., the X direction, perpendicular to the first direction, i.e., the X direction, from a lower end of the second support portion 151 and formed to be horizontal with respect to the mounting surface, and may serve as a connection terminal at the time of mounting the substrate.

The second mounting portion 152 may be disposed to be spaced apart from a lower surface of the multilayer capacitor 100 by a predetermined distance in the Z direction.

In addition, the second metal frame 150 may include a second cutting portion 153.

One or more second cutting portions 153 may be formed in a portion of a lower side of the second support portion 151 and the second mounting portion 152.

Because the second cutting portions 153 are formed only in the lower portion of the second support portion 151, an upper portion of the second support portion 151 may be maintained in a long connected state.

In addition, one second cutting portion 153 may be formed on the respective boundary lines of the multilayer capacitors 100 adjacent to each other in the Y direction.

According to the present exemplary embodiment, since the number of the multilayer capacitors 100 constituting the capacitor array 101 is five in total, four second cutting portions 153 may be formed.

By such second cutting portions 153, the second metal frame 150 may have a structure such that the support portion is individually bonded to each of the multilayer capacitors 100, and as a result, at the time of warpage deformation, the second support portion 151 may be divided into five portions and may be individually deformed.

In addition, the second cutting portion 153 may connect a portion of the lower side of the second support portion 151 and the second mounting portion 152 to each other.

That is, the second cutting portion 153 according to the present exemplary embodiment may be formed in an L-shape.

A multilayer capacitor according to the related art has a structure in which a capacitor body and a substrate are in direct contact with each other by a solder when being mounted on the substrate. Here, since heat or mechanical deformation generated in the substrate is directly transferred to the multilayer capacitor, it is difficult to secure a high level of reliability.

In the electronic component according to the present exemplary embodiment, since the plurality of multilayer capacitors 100 is formed of an integrated capacitor array 101, a high capacitance may be implemented, and thermal reliability, mechanical reliability, and tolerance to warpage deformation of the electronic component 200 may be improved by preventing stress from the substrate from being directly transferred to the respective multilayer capacitors 100 when the electronic component 200 is mounted on the substrate by bonding the first and second metal frames 140 and 150 to the opposing side surfaces of the capacitor array 101 to secure an interval between the capacitor array 101 and the substrate.

Meanwhile, in order to reduce the transfer of the warpage deformation stress from the substrate by bonding the metal frames to the multilayer capacitors, It is effective to bond the support portions of the metal frames to the opposite end surfaces of the multilayer capacitor in the X direction having the longest length in the multilayer capacitor.

However, in a case in which the plurality of multilayer capacitors are sequentially arranged in one direction so as to be electrically connected in parallel to constitute the capacitor array and the metal frames are then bonded to the capacitor array, the support portions of the metal frames may be bonded to the opposite end surfaces of the capacitor array in the X direction having a relatively small length, rather than to the opposite end surfaces of the capacitor array in the Y direction, which is the longest in the entire capacitor array.

Therefore, it is difficult for the metal frames to absorb the deformation with respect to the Y direction which is most affected by the warpage of the substrate, and defects such as deterioration and crack of the bonded surface may easily occur.

In the electronic component according to the present exemplary embodiment, the first and second metal frames may have one or more first and second cutting portions in the portions of the lower sides of the first and second support portions and first and second horizontal mounting portions.

Therefore, the electronic component may have a structure in which the first and second support portions and the first and second mounting portions are divided into a plurality of portions by the first and second cutting portions, and may be individually deformed at the time of warpage deformation. Accordingly, the deformation with respect to the Y direction by the warpage of the substrate is effectively absorbed and reduced, such that the defects such as deterioration and crack of the bonded surface described above may be prevented.

Meanwhile, when sizes of the first and second cutting portions are excessively increased in the first and second support portions, areas of the first and second support portions may decrease by the sizes of the first and second cutting portions, respectively. As a result, the fixing strength may be reduced.

Table 1 below illustrates warpage deformation test results according to the sizes of the cutting portion formed in the support portion.

The multilayer capacitors used in the respective samples are manufactured so as to have a length in the X direction of 3.2 mm, a length in the Y direction of 2.5 mm, and electrical characteristics of 10 μF.

In addition, in the capacitor array used in the test, the multilayer capacitors are arranged in a one-layer by five-column structure and the size of the cutting portion formed in the support portion is variously changed. After a temperature cycle of −55 to 125° C. is performed 100 times, the capacitor array was mounted on the PCB and the warpage deformation of 10 mm was repeated to observe a detachment pattern of the bonding portion of the metal frame. The results are shown in Table 1.

Here, as illustrated in FIG. 4, d1 denotes a length of the cutting portion in the Z direction, t denotes a length of the support portion in the Z direction, d2 denotes a length of the cutting portion in the Y direction, and b denotes a length of the multilayer capacitor.

TABLE 1

| d2/b | d1/t | | | |
|---|---|---|---|---|
| | 0.01 | 0.1 | 0.5 | 0.9 |
| 0.01 | PASS | PASS | PASS | NG |
| 0.1 | PASS | PASS | PASS | NG |
| 0.5 | PASS | PASS | PASS | NG |
| 0.85 | NG | NG | NG | NG |

In a case in which the cutting portions are formed in the metal frames, an effect of reinforcing the warpage deformation even if the reinforced degree is fine may be obtained.

However, as illustrated in Table 1, in the case in which the size of the cutting portion is excessively large, it may be seen that the area of the metal frame is reduced so that the metal frame is broken or detached from the capacitor array during the warpage deformation.

From Table 1, the size of the cutting portion formed in the support portion of the metal frame for preventing the deterioration of the bonded surface satisfies 0. 01≤d1/t≤0.5 and 0.01≤d2/b≤0.5.

Figure 6:
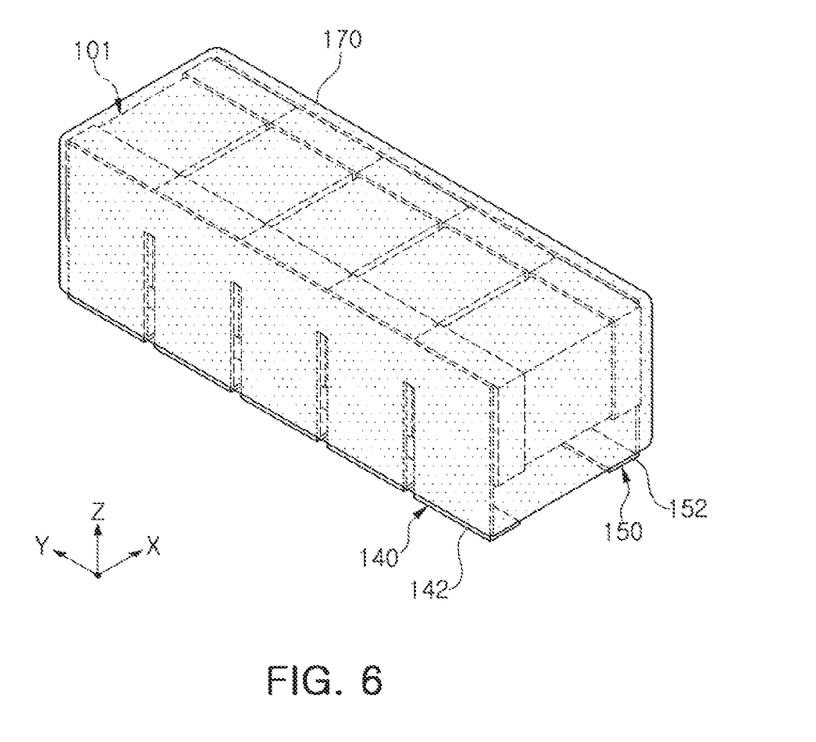
FIG. 6 is a perspective view illustrating a capsule portion formed on the electronic component of FIG. 4.

FIG. 6 is a perspective view illustrating a capsule portion formed on the electronic component of FIG. 4.

Referring to FIG. 6, the electronic component according to the present exemplary embodiment may further include a capsule portion 170 encapsulating the capacitor array 101.

The capsule portion 170 may be formed of an insulating resin such as an epoxy and may encapsulate all remaining portions of the electronic component except for the first and second mounting portions 142 and 152 in the first and second metal frames 140 and 150.

That is, lower surfaces of the first and second mounting portions 142 and 152 may be exposed externally of the capsule portion 170 so as to be mountable on the substrate.

Such a capsule portion 170 may serve to improve a bonded state between the capacitor array 101 and the first and second metal frames 140 and 150, and to improve reliability from an external environment.

Figure 7:
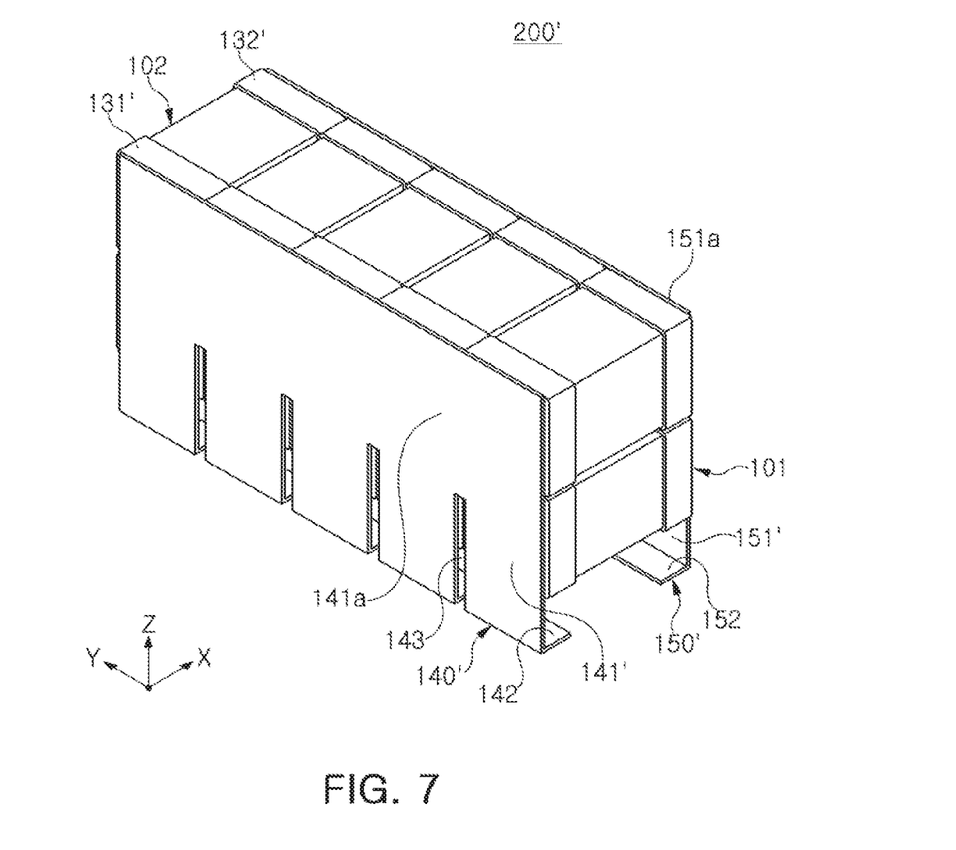
FIG. 7 is a perspective view illustrating a schematic structure of an electronic component according to another exemplary embodiment in the present disclosure.
Figure 8:
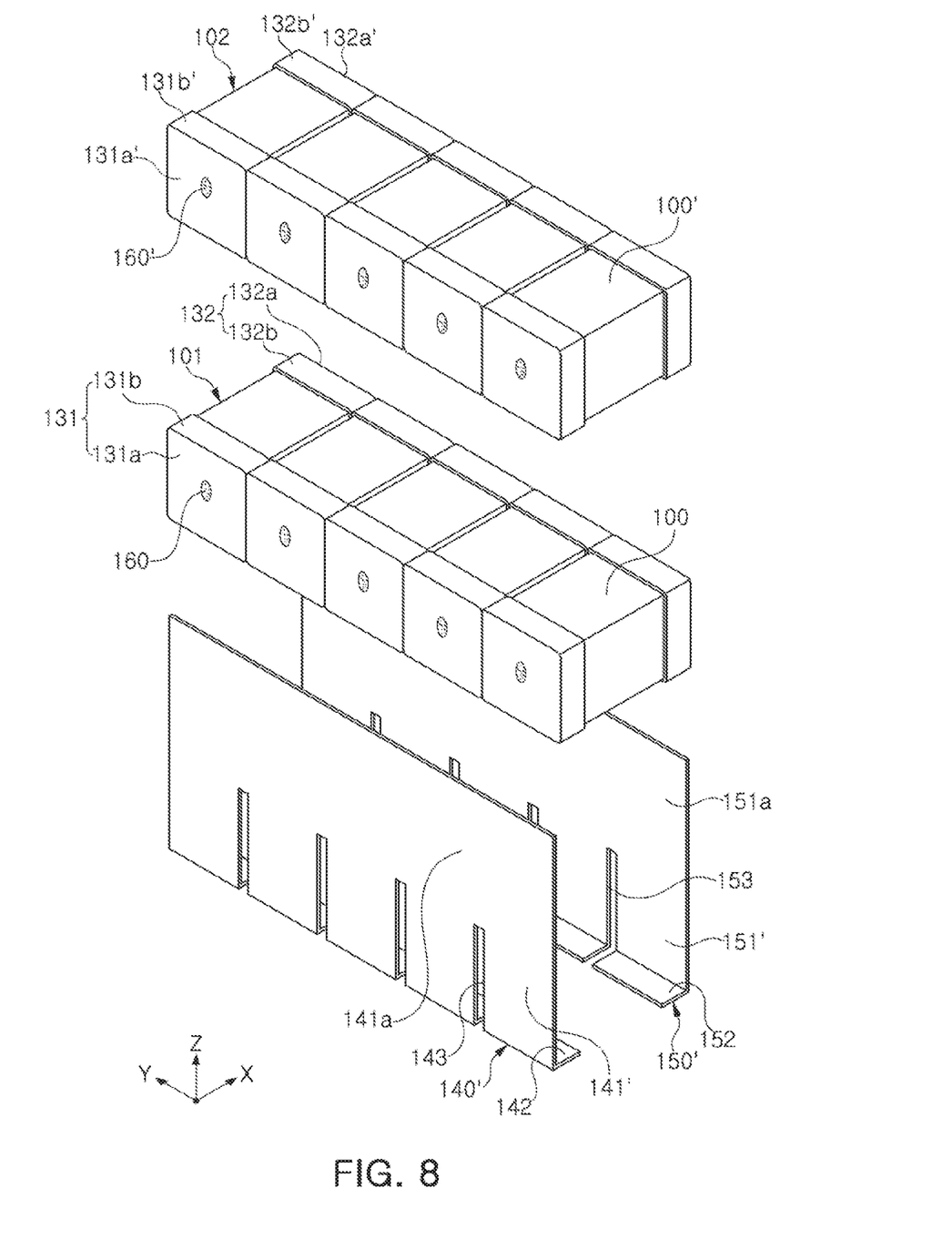
FIG. 8 is an exploded perspective view of the electronic component of FIG. 7.

FIG. 7 is a perspective view illustrating a schematic structure of an electronic component according to another exemplary embodiment in the present disclosure and FIG. 8 is an exploded perspective view of the electronic component of FIG. 7.

Referring to FIGS. 7 and 8, in an electronic component 200' according to the present exemplary embodiment, the capacitor arrays 101 and 102 may be stacked in at least two layers in the Z direction.

Lower portions of the first band portions 131b of first external electrodes 131' of the capacitor array 102 positioned on an upper side may be bonded to upper portions of the first band portions 131b of the first external electrodes 131 of the capacitor array 101 positioned at a lower side.

In addition, lower portions of the second band portions 132b of second external electrodes 132' of the capacitor array 102 positioned at the upper side may be bonded to upper portions of the second band portions 132b of the second external electrodes 132 of the capacitor array 101 positioned at the lower side.

In addition, a first support portion 141' of a first metal frame 140' may have a first extending portion 141a upwardly in the Z direction.

The first extending portion 141a may be bonded to first head portions 131a' of the first external electrodes 131' of a plurality of multilayer capacitors 100' of the capacitor array 102 positioned at the upper side.

Conductive bonding portions 160' may be provided in the first head portions 131a' of the multilayer capacitors 100' positioned at the upper side.

In addition, a second support portion 151' of a second metal frame 150' may have a second extending portion 151a upwardly in the Z direction.

The second extending portion 151a may be bonded to second head portions 132a' of the second external electrodes 132' of the plurality of multilayer capacitors 100' of the capacitor array 102 positioned at the upper side.

Similarly to the first head portions 131a', the conductive bonding portions may be provided in second head portions 132a' of the multilayer capacitors 100'positioned at the upper side.

Figure 9:
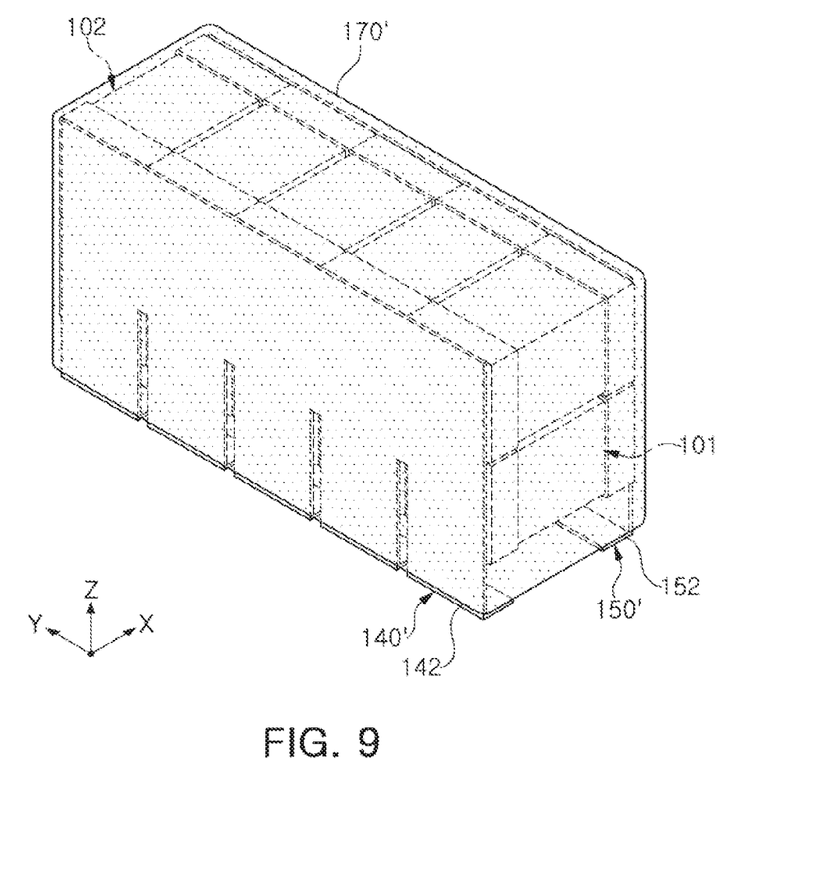
FIG. 9 is a perspective view illustrating a capsule portion formed on the electronic component of FIG. 7.

FIG. 9 is a perspective view illustrating a capsule portion formed on the electronic component of FIG. 7.

Referring to FIG. 9, the electronic component according to the present exemplary embodiment may further include a capsule portion 170' encapsulating the capacitor arrays 101 and 102.

The capsule portion 170' may be formed of an insulating resin such as an epoxy and may encapsulate all remaining portions of the electronic component except for the first and second mounting portions 142 and 152 in the first and second metal frames 140' and 150'.

That is, the lower surfaces of the first and second mounting portions 142 and 152 may be exposed externally of the capsule portion 170' so as to be mountable on the substrate.

Such a capsule portion 170' may serve to improve a bonded state between the two capacitor arrays 101 and 102 and the first and second metal frames 140' and 150', and to improve reliability from an external environment.

As set forth above, according to an exemplary embodiment in the present disclosure, a high capacity electronic component may be provided and thermal reliability, mechanical reliability, and tolerance to warpage deformation of the electronic component may be improved.

While exemplary embodiments have been shown and described above, it will be apparent to those skilled in the art that modifications and variations could be made without departing from the scope of the present invention as defined by the appended claims.

What is claimed is:

1. An electronic component comprising:
a capacitor array including a plurality of capacitors which are sequentially arranged in a first direction; and
a pair of metal frames disposed on opposing side surfaces of the capacitor array, respectively, and connected to first and second external electrodes of the plurality of capacitors, respectively,
wherein each of the pair of metal frames includes:
a support portion bonded to head portions of corresponding external electrodes; and
a mounting portion extending in a second direction perpendicular to the first direction from lower ends of the support portion, and
a cutting portion formed, on each boundary line of the capacitors adjacent to each other in the first direction, in portions of the mounting portion and a lower side of the support portion such that an upper side of the support portion remains contiguous and a portion of the head portion of the corresponding external electrode is exposed through the cutting portion, the support portion being structured such that an entirety of the contiguous upper side of the support portion is in contact with the head portions of the corresponding external electrodes.

2. The electronic component of claim 1, wherein the cutting portion connects the portion of the lower side of the support portion and the mounting portion to each other to have an L shape.

3. The electronic component of claim 1, wherein $0.01 \leq d1/t \leq 0.5$ and $0.01 \leq d2/b \leq 0.5$ in which a length of the cutting portion in a thickness direction is d1, a length of the support portion in the thickness direction is t, a length of the cutting portion in the first direction is d2, and a length of the capacitor in the first direction is b.

4. The electronic component of claim 1, further comprising a capsule portion encapsulating the capacitor array,
wherein the mounting portion is exposed externally of the capsule portion.

5. The electronic component of claim 1, wherein a conductive adhesive portion is provided between the head portion of the external electrode and the support portion.

6. The electronic component of claim 1, wherein the capacitor includes a body, and the first and second external electrodes formed on opposite end surfaces of the body in a second direction, and
the body includes a dielectric layer, and first and second internal electrodes which are alternately disposed while having the dielectric layer interposed therebetween.

7. The electronic component of claim 6, wherein the head portions of the first and second external electrodes are formed on the opposite end surfaces of the body in the second direction; and
the first and second external electrodes further include first and second band portions respectively extending from the first and second head portions to portions of upper and lower surface of the body and portions of opposing side surfaces of the body.

8. The electronic component of claim 1, wherein the capacitor array is stacked in at least two layers.

9. The electronic component of claim 8, wherein the support portions extend to head portions of the plurality of capacitors of the capacitor array positioned on an upper side.

10. The electronic component of claim 8, further comprising a capsule portion encapsulating the plurality of capacitor arrays, wherein the mounting portion is exposed externally of the capsule portion.

11. A mounting frame for mounting an electronic component, the mounting frame comprising:
a first metal frame including a first support portion in a first plane and a first mounting portion extending from an edge of the first support portion in a second plane perpendicular to the first support portion; and
a second metal frame including a second support portion in a third plane parallel to the first plane and a second mounting portion extending from an edge of the second support portion in the second plane toward the first mounting portion,
wherein the first and second metal frames are separated in a first direction extending from the first plane to the third plane to accommodate an array of capacitors disposed sequentially in a second direction perpendicular to the first direction and parallel to the second plane,
wherein portions of each of the first support portion and the first mounting portion include first cut portions spaced apart such that the first cut portions lie at a boundary between first external electrodes of adjacent capacitors of the array, the first external electrodes directly contacting the first support portion,
wherein portions of each of the second portion and the second mounting portion include second cut portions spaced apart such that the second cut portions lie at a boundary between second external electrodes of adjacent capacitors of the array, the second external electrodes directly contacting the second support portion,
wherein the first cut portions and the second cut portions extend away from the second plane to expose respectively a portion of the first and second external electrodes such that a portion of each of the support portions away from the second plane remains contiguous, and
wherein an entirety of the contiguous portion of the support portions contacts the corresponding external electrode.

12. The mounting frame of claim 11, wherein $0.01 \leq d1/t \leq 0.5$ and $0.01 \leq d2/b \leq 0.5$ in which a length of the cutting portion in a second direction perpendicular to the second plane is d1, a length of the support portion in the second direction is t, a length of the cutting portion in a third direction perpendicular to the first and the second directions is d2, and a length of the capacitor in the third direction is b.

13. The mounting frame of claim 11, the first and second support portions extend in a second direction perpendicular to second plane to accommodate a stack of at least two capacitor arrays stacked in the second direction.

14. The mounting frame of claim 13, wherein the first and second cut portions extend along corresponding support portions to reach a portion of the capacitor array further away from the second plane.

15. The mounting frame of claim 11, wherein when disposed, the capacitors of the capacitors are spaced apart from the first and second mounting portions in a second direction perpendicular to the second plane.

* * * * *